United States Patent [19]

Avenet et al.

[11] Patent Number: 5,709,356
[45] Date of Patent: Jan. 20, 1998

[54] ANTI-SPARK STRUCTURE, IN PARTICULAR FOR AIRCRAFT

[75] Inventors: Jean-Pierre Avenet, Paris; Pascal Gondot, Saint Georges, both of France

[73] Assignee: Aerospatiale Societe Nationale Industrielle, Paris, France

[21] Appl. No.: 549,670

[22] PCT Filed: Apr. 13, 1995

[86] PCT No.: PCT/FR95/00477

§ 371 Date: Nov. 30, 1995

§ 102(e) Date: Nov. 30, 1995

[87] PCT Pub. No.: WO95/28319

PCT Pub. Date: Oct. 26, 1995

[30] Foreign Application Priority Data

Apr. 15, 1994 [FR] France ............... 94 04507

[51] Int. Cl.⁶ ........................... B64D 45/02
[52] U.S. Cl. ................ 244/1 A; 244/132; 361/218
[58] Field of Search ................ 244/1 A, 131, 244/132; 361/218

[56] References Cited

U.S. PATENT DOCUMENTS

| | | |
|---|---|---|
| 2,787,185 | 4/1957 | Rea et al. ............ 244/131 X |
| 3,755,713 | 8/1973 | Paszkowski . |
| 3,989,984 | 11/1976 | Amason et al. . |
| 4,556,591 | 12/1985 | Bannink, Jr. . |
| 4,755,904 | 7/1988 | Brick ............ 244/1 A |
| 4,839,771 | 6/1989 | Covey . |
| 4,891,732 | 1/1990 | Jones ............ 242/1 A |
| 4,905,931 | 3/1990 | Covey ............ 244/132 X |
| 5,175,665 | 12/1992 | Pegg ............ 242/1 A |
| 5,314,144 | 5/1994 | Porter, Jr. et al. ............ 244/132 |
| 5,461,534 | 10/1995 | Gondot et al. . |

FOREIGN PATENT DOCUMENTS

| | | |
|---|---|---|
| 0248122 | 12/1987 | European Pat. Off. . |
| 0269458 | 6/1988 | European Pat. Off. . |
| 0334011 | 2/1989 | European Pat. Off. . |
| 0425292 | 5/1991 | European Pat. Off. . |
| 1042277 | 12/1991 | U.S.S.R. ............ 244/131 |
| 2212580 | 7/1989 | United Kingdom . |
| 2226801 | 7/1990 | United Kingdom ............ 244/132 |

*Primary Examiner*—William Grant
*Attorney, Agent, or Firm*—Fisher, Christen & Sabol

[57] ABSTRACT

An anti-spark structure includes first and second elements of composite material which are at least partially superimposed and assembled together with a screw and nut. The nut has a recess which defines a storage chamber for storing gases formed at the interface of the screw and the elements. A passage is provided in the structure for allowing gases stored in the chamber to escape from the structure.

9 Claims, 3 Drawing Sheets

ANTI-SPARK STRUCTURE, IN PARTICULAR FOR AIRCRAFT

FIELD OF THE INVENTION

The present invention relates to anti-spark structures, in particular for aircraft.

BACKGROUND OF THE INVENTION

Already known are structures including:

two elements of composite material each one having an outer face and an inner face and which two elements are located such that the inner face of the first of said elements is at least partially superimposed on the outer face of the second of said elements, the superimposed parts of said elements including pairs or opposing holes;

screws with countersunk heads, each one of which passes through a pair of said opposing holes such that its head becomes housed in a countersink provided in the outer face of said first element;

nuts capable of interacting respectively with said screws and of bearing on the inner face of said second element in order to press the countersunk head of the corresponding screw into said countersink.

When such a structure is subjected to the action of lightning, the discharge current is propagated via the screws toward said first and second elements and toward said nuts.

Owing to the generally high density of said discharge current and to the high resistance to current at the interface between on the one hand said screws and on the other hand said first and second elements, significant heating takes place at said interface by the Joule effect. This heating may at least locally melt the composite material of said first and second elements and thus create sublimation gases at said interface.

Such gases can give rise to overpressures which may destroy said structure.

Furthermore, the significant heating and significant sparking which are generated then may also be extremely damaging to the structure, especially if the latter forms part of a fuel tank, posing a risk of fuel catching fire.

It will be noted that the physical phenomena described above are even more substantial between the nut and the second element. This is because some of the discharge current coming from the screw arrives in the nut, without appreciable heating at the interface between the screw and the nut. There is no appreciable heating because the resistance at the interface is low, and is directed into the second element transversely thereto. This current directed transversely encounters high resistance especially if the second element consists of a carbon-carbon structure for which current flows much more easily longitudinally than transversely.

In order to remove the gases formed at the interface between the screw and the first and second elements, document GB-2 226 801 proposes two different solutions. According to a first solution, provision is made to replace the nut with a female element exhibiting a complicated shape and a substantial bulk, and including at least one storage chamber which is open toward the second element. The storage chamber is intended to recover and to store the gases formed at the interface. Even though, by means of such an orientation of the opening allowing access to the chamber, the female element is quite able to recover the gases formed, this solution is not really very attractive from the industrial point of view because the female element is much too complex for the envisaged use, regardless of the embodiment proposed.

According to a second solution of the GB-2 226 801 document, provision is made to form, in the screw, passages allowing certain regions of the interface to be made to communicate with the outside of the structure, in order to remove the gases formed at the interface directly to the outside. However, since such a solution can be envisaged only locally, it is impossible to recover all the gases formed at the interface. This is indeed what the aforementioned document explicitly confirms, because in such cases storage chambers are provided in the nut for the gases which could not be removed by the passages provided in the screw. This second solution is also, therefore, not satisfactory.

The object of the present invention is to overcome these drawbacks and to allow, using only standard, barely modified nuts, the structure to be made resistant to bolts of lightning. It is also an object of the invention to find a solution to the problem posed by the gases which are inevitably formed at the interface between the screw and the first and second elements when the structure is struck by lightning.

SUMMARY OF THE INVENTION

According to the invention, an anti-spark structure is provided, in particular for aircraft, which includes:

two elements of composite material each one having an outer face and an inner face, the two elements being located such that the inner face of the first element is at least partially superimposed on the outer face of the second element, said elements including opposing holes;

a screw with a countersunk head passing through the opposing holes such that its head becomes housed in a countersink provided in the outer face of the first element; and a nut capable of interacting with the screw and capable of bearing, via a bearing face, on the inner face of said second element in order to draw the countersunk head into the countersink and to hold the elements together in a fastened position. The nut is equipped, in its bearing face, with a recess which forms, with the second element and the screw in the fastened position, a storage chamber capable of storing the gases generated at the interface between the screw and the first and second elements when the anti-spark structure is struck by lightning. The screw further includes a removal passage establishing, in the fastened position, a communication path between the storage chamber and the outside of said anti-spark structure, which allows the gases stored in the storage chamber to be removed to the outside.

Thus, by virtue of the invention, the recovery and removal of the gases formed at the interface are attained by using a standard nut provided only with a recess, and not a complicated and voluminous female element which is unattractive from the industrial point of view, like the one proposed in the aforementioned known solution.

Furthermore, because of the location where it is formed, the storage chamber makes it possible to recover most of the gases created at the interface.

Furthermore it will be noted that making the recess in the bearing face of the nut prevents a circulation of the discharge current between the screw and the second element, by means of the nut. The prevented circulation avoids generally significant heating at this point, as indicated before, which is likely to be damaging. In particular, to simplify its production, the recess may exhibit an annular shape coaxial with the nut.

Advantageously, the removal passage includes:

a first passage formed longitudinally on the shank of said screw between the head of said screw and a point on said screw which is situated at least level with said storage chamber toward the inside of the anti-spark structure in the fastened position; and at least one second passage formed transversely to said shank of the screw between said first passage part and a point on the external face of said shank situated in said storage chamber in the fastened position.

Thus, said removal passage may easily be produced from two drillings made in said screw, a longitudinal drilling and a transverse drilling.

For preference, said first and second passage parts are of cylindrical shape and, in addition, said first passage part is formed coaxially with said shank of the screw.

The present invention exhibits quite a specific advantage when said nut is a cap nut.

This is because, in this case, according to a preferred embodiment of the invention, said cap nut advantageously includes an additional recess which, in the fastened position, with the external face of the opposite end of the screw to the head, forms an additional storage chamber.

Thus, a second storage chamber is obtained for the gases which may not have been able to be recovered by the first storage chamber and/or the gases which may have escaped from said first storage chamber via the threaded connection between the nut and the screw. The second chamber thus prevents these gases from gaining access to the inside of the anti-spark structure.

To simplify the production of said additional storage chamber, said additional recess advantageously corresponds to the extension of the tapped hole of the nut intended to accommodate the screw.

Advantageously, in order to remove to the outside of the structure the gases stored in said additional storage chamber, said screw includes a third passage part establishing a communication path between said removal passage and the external face of the opposite end of the screw to the head of the screw.

For preference, said third passage part corresponds to the extension of said first passage part, which makes it easier to produce said passage making it possible to make one longitudinal through-drilling in said screw.

BRIEF DESCRIPTION OF THE DRAWINGS

The figures of the appended drawing sheets will make it easy to understand how the invention may be produced. In these figures, identical reference numerals denote similar elements.

DETAILED DESCRIPTION OF THE INVENTION

Figure 1:
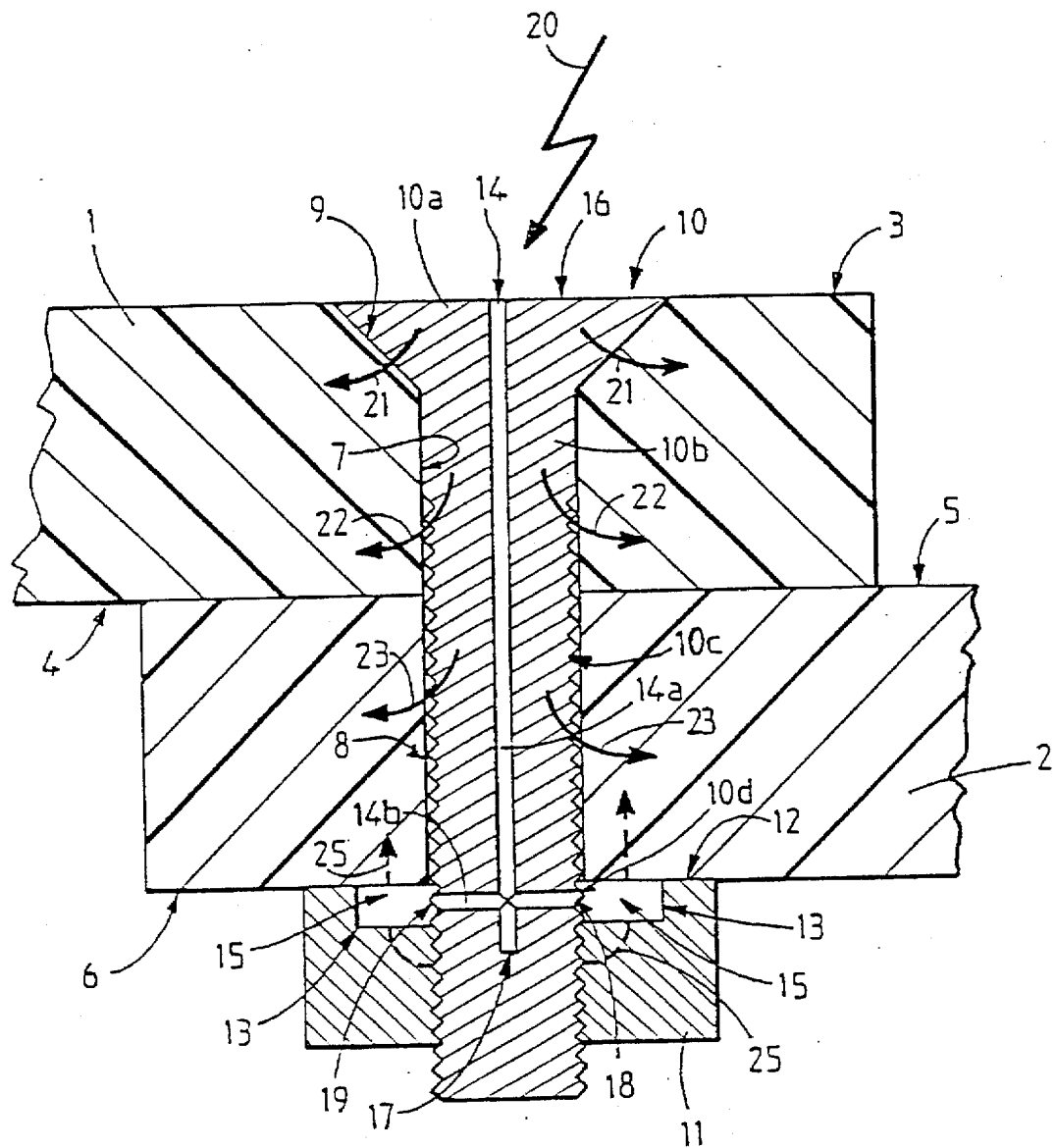
FIG. 1 is a partial and schematic transverse sectional view of an anti-spark structure in accordance with a first embodiment of the invention.

The anti-spark structure in accordance with the invention, produced according to a first embodiment and represented in FIG. 1, includes two elements 1 and 2 of composite material, for example based on carbon fibers. Said anti-spark structure may, for example, form part of a fuel tank, in particular a fuel tank of an aircraft.

The element 1 includes an outer face 3 and an inner face 4, while the element 2 includes an outer face 5 and an inner face 6. Said elements 1 and 2 are superimposed so that the inner face 4 of the element 1 overlaps the outer face 5 of the element 2 at least partially. In the overlapping region, said elements 1 and 2 are respectively provided with holes 7 and 8, opposite one another, in the overlapping position of FIG. 1.

The hole 7 includes a countersink 9 on the same side of element 1 as the outer face 3 of the element 1.

Inserted into the opposing holes 7 and 8 is a metal screw 10 with a countersunk head 10a and a shank 10b equipped with a thread 10c over the most part of the shank and at the end opposite the countersunk head 10a. The screw 10 is such that its countersunk head 10a exactly matches the countersink 9 and the shank 10b bears against the walls of the holes 7 and 8.

Interacting with the threaded part 10c of the screw 10 is a nut 11, of a practically standard type, capable of bearing, via a bearing face 12, on the inner face 6 of the element 2 in order to pull, draw or influence the countersunk head 10a of the screw 10 into the countersink 9 and to hold said elements 1 and 2 together in a fastened position, as represented in FIG. 1.

In accordance with the present invention:

The nut 11 has a recess 13 made for example by machining in said bearing face 12, coaxially with said nut 11 so as to form with the inner face 6 of the element 2 and the outer face 10d of the shank 10b of the screw 10, in said fastening position, a storage chamber 15 of annular shape; and said screw 10 is equipped with a passage 14 establishing, in said fastening position represented, a communication path between said storage chamber 15 and the outside of the anti-spark structure.

Said passage 14 includes:

a first passage 14a of cylindrical shape formed longitudinally in said shank 10b at the center thereof between the external face 16 of the head 10a of said screw 10 and a point 17 situated at least at the level of said storage chamber 15 toward the inside of the anti-spark structure in the fastened position; and a second passage 14b also of cylindrical shape, having the same diameter as said first passage part 14a, formed so that it passes transversely through said shank 10b so that the opposed openings 18 and 19 thus created in the external face 10d of the shank 10b emerge in said storage chamber 15, in the fastened position.

Thus, when lightning symbolized by an arrow 20 reaches the head 10a of the screw 10, the current removed passes on the one hand into the element 1, as illustrated by arrows 21 and 22, and on the other hand into the element 2, as illustrated by arrows 23. Owing to the high resistance at the interface between the screw 10 and the elements 1 and 2, high degrees of heating are likely to be generated at the region of the interface when the removed current has a high density.

This heating may create at least local melting of the composite materials forming said elements 1 and 2 and thus generate gases at high pressures. These gases which circulate along said interface are recovered by the storage chamber 15 which has direct access to said interface in the region of the lower surface 6 of the element 2. The storage chamber 15 in accordance with the invention can thus recover all the gases flowing along said interface.

The gases thus stored in said storage chamber 15 are removed toward the outside of the anti-spark structure through the passage 14 which makes it possible to use a low-volume storage chamber which can be formed in a standard nut, as opposed to the solution recommended by the aforementioned document GB-2 226 801, for which the nut was replaced by a female element of great complexity, which was not attractive from the industrial point of view. The ability to remove gases also avoids the generation in said storage chamber 15 of excessively high heat and above all avoids generation of overpressures which, if present, could strip the nut 11 off the screw 10.

It will also be noted that the recess 13 in the nut 11 prevents the electric current from circulating between the screw 10 and the element 2 via the nut 11, in the immediate vicinity of screw 10, in the direction indicated by arrows 25 drawn in broken line. If they were present, such electric currents flowing transversely to element 2 would give rise to substantial heating in element 2. Substantial heating would otherwise result owing to the structure of element 2 made of composite material with carbon fibers, which structure has a high resistance to current in the transverse direction.

Thus, by virtue of the recess 13 of the invention, such electric currents cannot exist, which is highly advantageous and therefore also contributes to limiting the heating effect when the anti-spark structure is struck by lightning.

Figure 2:
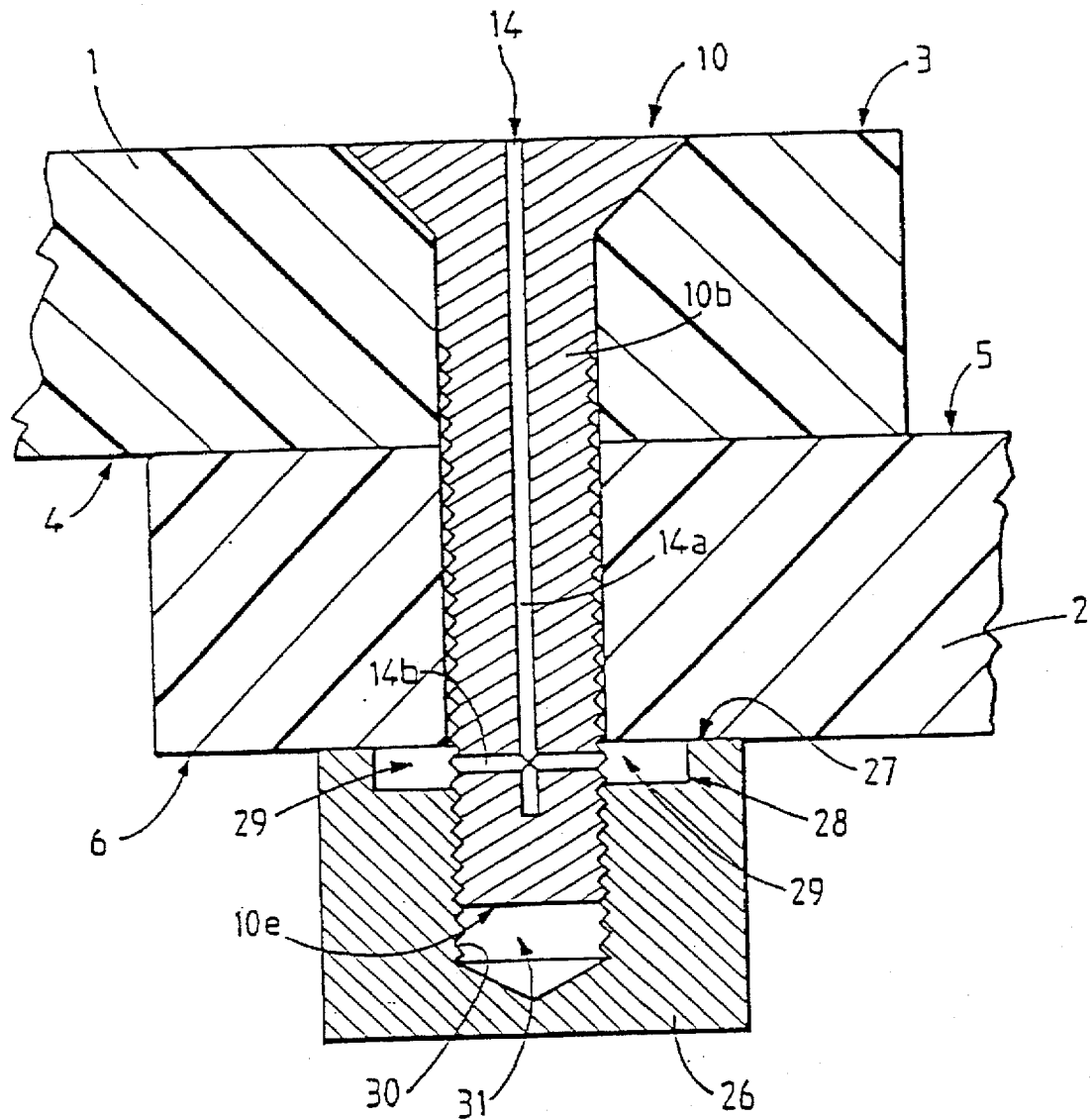
FIG. 2 is a partial and schematic transverse sectional view of an anti-spark structure in accordance with a second embodiment of the invention.
Figure 3:
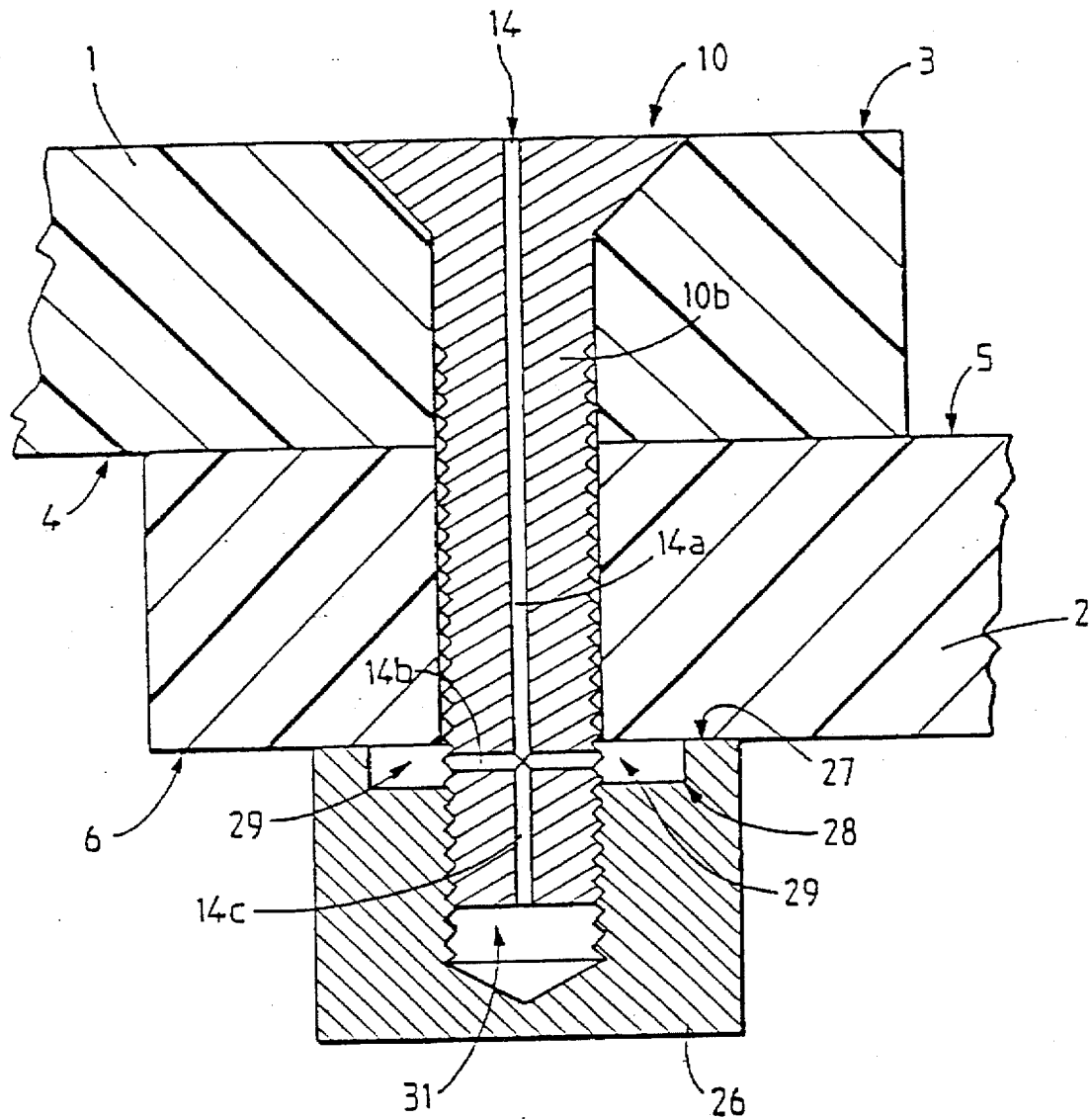
FIG. 3 is a partial and schematic transverse sectional view of an anti-spark structure in accordance with a third embodiment of the invention.

According to a second embodiment of the invention, as represented in FIGS. 2 and 3, the anti-spark structure includes a cap nut 26 used in the same way as the nut 11 of FIG. 1.

Said nut 26 is equipped, in a bearing face 27 which is intended to come into contact with the inner face 6 of the element 2, with a recess 28 made identically to the recess 13 of the nut 11 and, in the fastened position, forming a storage chamber 29 identical to the storage chamber 15 of FIG. 1.

The tapped hole 30 of said nut 26 intended to interact with the screw 10 is produced so that, in the fastened position represented in FIG. 2, an additional storage chamber 31 is formed by the bottom of said tapped hole 30 and the opposite end 10e of the screw 10 to the head 10a.

The storage chamber 31 makes it possible, in particular, to recover the gases which might escape from the storage chamber 29 along the interface between the screw thread 10c of the screw 10 and the interacting tapped hole 30.

In order to be able to remove to the outside of the anti-spark structure the gases stored in chamber 31, a third passage 14c is provided allowing the chamber 31 to be connected to the passage 14 as shown in FIG. 3.

The third passage 14c corresponds to an extension of said first passage 14a so that the screw 10 is thus equipped with a longitudinal through-drilling, which makes it easy to produce passage 14.

We claim:

1. An anti-spark structure comprising:

a first element and a second element each comprising a composite material and having an outer surface and an inner surface, said first and second elements being disposed such that the inner surface of the first element is at least partially superimposed on the outer surface of the second element, said first and second elements each having a hole therethrough, said holes being aligned with one another;

a screw having a threaded shank, said shank being disposed through said holes, wherein an interface is formed between said shank and said first and second elements; and a threaded nut which engages the threaded shank of said screw, said nut having a bearing surface which contacts the inner surface of said second element, said bearing surface having a recess formed therein, said recess and the inner surface of said second element defining a storage chamber, said screw and nut holding the first and second elements together in a fastened position; wherein a communication is provided between the interface and the storage chamber such that substantially all of the gases flowing along said interface and recovered by said storage chamber, and a gas removal passage is formed through said screw and provides a communication from the storage chamber to the atmosphere outside of the anti-spark structure, said gas removal passage allowing the escape of substantially all of the generated gas from within the storage chamber.

2. The anti-spark structure according to claim 1 wherein said recess has an annular shape arranged coaxially with said nut.

3. The anti-spark structure according to claim 1 wherein said gas removal passage comprises:

a first passage formed longitudinally within the shank of the screw between the screw head and a point along the length of the screw which, in the fastened position, is disposed within the storage chamber; and a second passage formed transversely to the shank of the screw and providing a communication between said first passage and said storage chamber.

4. The anti-spark structure according the claim 3 wherein said first and second passages are each of cylindrical shape.

5. The anti-spark structure according to claim 3 wherein said first passage is formed coaxially within the shank of the screw.

6. The anti-spark structure according to claim 3 wherein said nut consists of a cap nut having formed therein an additional recess which, together with the end of the screw opposite the head, forms an additional storage chamber in the fastened position.

7. The anti-spark structure according to claim 6 wherein said additional recess is formed from an extension of a tapped hole in said nut which receives and cooperates with the threads of said screw.

8. The anti-spark structure according to claim 6 wherein said gas removal passage further includes a third passage which provides a communication between said additional storage chamber and said first passage.

9. The anti-spark structure according to claim 8 wherein said third passage is aligned with said first passage.

* * * * *